US007249142B2

(12) United States Patent
Altschul et al.

(10) Patent No.: US 7,249,142 B2
(45) Date of Patent: Jul. 24, 2007

(54) AUTOMATIC MACHINE FOR PRODUCTION OF SEQUENCES BASED ON PROFILES AS WELL AS METHOD FOR AUTOMATIC PRODUCTION OF SEQUENCES

(76) Inventors: Jacob Falkentorp Altschul, Absolongade, 7, 3.tv, DK-1658 Copenhagen V (DK); Peter Berg Steffensen, Harsdorffsvej 10, st., DK-1874 Frederiksberg C (DK); Mikael Altschul Henderson, Azaleavej 29, st., DK-2000, Frederiksberg C (DK)

( * ) Notice: Subject to any disclaimer, the term of this patent is extended or adjusted under 35 U.S.C. 154(b) by 205 days.

(21) Appl. No.: 10/490,922

(22) PCT Filed: Oct. 30, 2002

(86) PCT No.: PCT/DK02/00720

§ 371 (c)(1),
(2), (4) Date: Oct. 4, 2004

(87) PCT Pub. No.: WO03/058494

PCT Pub. Date: Jul. 17, 2003

(65) Prior Publication Data

US 2005/0071370 A1    Mar. 31, 2005

(30) Foreign Application Priority Data

Nov. 1, 2001    (DK)    ............................... 2001 01619

(51) Int. Cl.
  G06F 7/00    (2006.01)
  G06F 17/00   (2006.01)
  G06F 3/00    (2006.01)
  G06F 9/00    (2006.01)
(52) U.S. Cl. .................. 707/102; 707/101; 715/700
(58) Field of Classification Search ............... 707/200, 707/201, 101, 102, 100; 84/601, 609, 618, 84/653
See application file for complete search history.

(56) References Cited

U.S. PATENT DOCUMENTS

| 5,870,746 | A  | * | 2/1999 | Knutson et al. | ............ 707/101 |
| 6,243,725 | B1 | * | 6/2001 | Hempleman et al. | ....... 715/530 |
| 6,282,318 | B1 | * | 8/2001 | Dietrich et al. | ............. 382/209 |
| 6,430,573 | B1 | * | 8/2002 | Pachet et al. | ............. 707/104.1 |
| 6,452,083 | B2 | * | 9/2002 | Pachet et al. | .................. 84/609 |
| 2003/0046008 | A1 | * | 3/2003 | Wolfson et al. | ................ 702/19 |

* cited by examiner

*Primary Examiner*—Sam Rimell
*Assistant Examiner*—Jared Bibbee
(74) *Attorney, Agent, or Firm*—Allen, Dyer, Doppelt, Milbrath & Gilchrist, P.A.

(57) ABSTRACT

The present invention concerns a method for generating sequences of elements from a collection of elements where the sequences generated accord with rules and requirements placed on characteristics of the sequences in general and on characteristics of the individal elements in patricular.

19 Claims, 9 Drawing Sheets

I

V

II

VI

III

VII

IV

VIII

Figure 1:
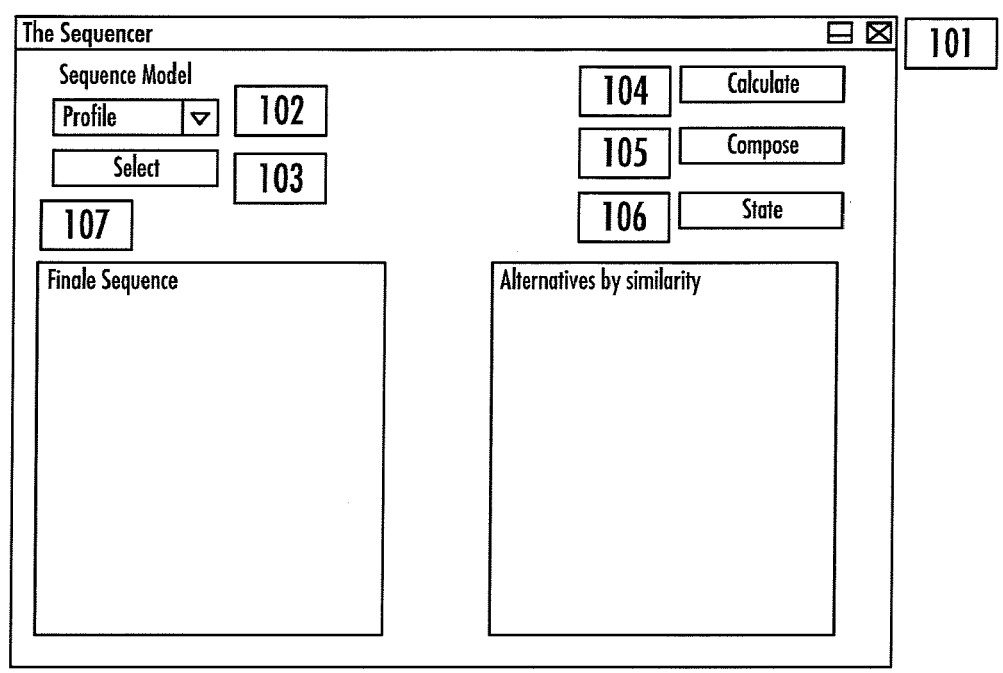

AUTOMATIC MACHINE FOR PRODUCTION OF SEQUENCES BASED ON PROFILES AS WELL AS METHOD FOR AUTOMATIC PRODUCTION OF SEQUENCES

The present invention concerns a method for generating sequences of elements from a collection of elements where the sequences generated accord with rules and requirements placed on characteristics of the sequences in general and on characteristics of the individal elements in patricular.

More specifically, the invention concerns a method and apparatus for generating sequences of elements from a collection of elements from references to and meta-data of said elements stored on a computer-readable medium, utilizing a user-defined or system-generated profile, methods of identifying lists or sets of element-candidates to sequences, and method for selecting elements to sequences from said lists or sets.

From WO patent document A 01/77846 a system and methods is known which utilizes a number of pre-defined, delimited "streams" and ad-hoc selection of elements within these boundaries based upon profiles and execution rules, where each element has meta-data attached concerning the elements qualitites.

The pre-definition of streams is performed by experts, which piece together Boolean operators to unique definitions of inclusion or exclusion of data elements relative to their meta-data. For final execution, experts compile user-profiles arranging a series of streams from which the execution draws. This it is possible to firstly select an element from one stream, then an element from another stream, then from a third stream, and then from the first stream again, and so on, under special care for characteristics of where the collection-elements beginning and end, such that the transition from one element to the next is smooth.

This approach is inappropriate since no relatively qualified alternatives are provided to each collection-element in the end-sequence, there there are no means of dynamically adjusting the parameters fundamental to the genereation of the sequence, that no means are offered to recommended or add further or extra elements (in the form of e.g. sequence profiles), and that the streams themselves are internally disorganised, wherefore the collection-elements are qualitatively unrelated and unranked.

From WO patent document A 01/67753 (Daniel Benyamin, Phatnoise) is known a system and method for generating sequences ("playlists") based on a comparison of criteria for sequences with characteristics of collection-elements. The method prescribes that collection-elements are added singularly to one or more end-sequences if criteria for sequences accord with characteristics of the collection-elements, and that each end-sequence is made available for special execution. End-sequences can be manipulated individually, and the result is an execution of playlists where all collection-elements in a sequence abide by specific rules for the content of sequence.

This approach is inappropriate since no care is taken to building a specific sequence structure or a specific execution sequences, and that (as above) there are no means of providing immediate qualitativly relevant alternatives for each collection-element.

From WO patent document A 01/35667 (Jeffrey Boulter, Launch Media) is known a system and method for generating sequences ("playlists") from general or specific preferences wrt. collection-elements (track), producer (artist), or body of work (album). The method includes selecting, from one massive collection of elements, elements to a sequence one at a time or for a whole sequence from an accumulated profile of the recipients specific preferences wrt. specific collection-elements ("track"), delimited element-sets ("album") and element-creator ("artist").

This approach is inappropriate since it is not possible to generate sequences with a given structure (because no profiles or temaples are used, for instance), since it is not possible to provide immediate qualitativly relevant alternatives for each collection-elemen, and since it is not possible to manipulere the sequence production beyond the three criteria listed above.

It is furthermore characteristic of all the methods mentioned, as well as similar methods generally, that there to no mentionable degree is distinguished qualitatively between the individual collection-elements within a set, playlist or stream, wherefore such sets, playlists and streams have significantly limited functionality and usefulness.

From patent document EP1193616 (and related to this more or less overlapping patent documents by the same inventor: U.S. Pat. No. 6,430,573, US2002078029, EP1215834, JP2002117069, US2002002897, EP1170722, JP2000067033, JP2000069600, JP2000056975, EP0961262, EP0961209) is known a method for production of sequences of finite lenght from meta-data of the elements i a collection of elements, where the choice of typicaly one starting element and one ending element is the basis of a similarity or likeness-based selection to an endsequence of a number of intermediate elements with appropriate "morphological" characteristics, and where the end-sequences' collection-elements can be de-selected and a an adjusted end- sequence is regenerated after re-start of the apparatus or systeme. To this class of approaches belong also a method for the production of sequences as expressed in patent document U.S. Pat. No. 6,452,083, where the choice of a singular starting element is the basis of a similarity or likeness-based selection to all end-sequence of a number of elements incrementally (one after the other), similarly based on "morphological characteristics".

These methods and approaches are inappropriate, since none of them cater to or make available qualitatively relevant alternatives for each of the collection-elements in the end-sequence, offers no means of dynamic adjustment and control of the paramenters fundamental to the sequence production, offers no means of structured production and manipulation of sequences, and offering no qualitive relationship or rank between the collection-elements in an end-sequence.

The examined instances of sequence automatons can be grouped in accordances with their respective traits pf inappropriateness. The first group is exemplified by patent document A01/77846, wherein is described a sequence production method of finding elements without calculating similarity, men with a simple form of rigid structure. The method requires that experts and users have indepth knowledge of the specific area of application, and that there for each production task is made an extensive, preparatory analysis, wherefore the resulting solution is correspondingly difficult to re-use on collections of sizes and quality-levels. Thus it makes no sense using the method on many different collections simultaneously. The collection will, in principal, have to be compile for each exact occasion for the method to be genuinely appropriate.

Another groups is exemplified by patent document A 01/67753, wherein is described a method with immediate forms of determining likeness to an ideal, but where both means and ends are qualification of unstructured set without comparative computation. Thus it is not considered that experiences can be compiled in sequences like chapters of a book, arranged for dramaturgical effect. The methods therfore have a useful but un-nuanced application.

The third and final group is exemplified by patent document EP1193616, wherein a description is given of a method without rigid structure, men which takes advantage of computations of likeness. The method is, however, inappropriate in that no means are provided for creating and recreating individual, symbolic routes through a collection of elements. Each time a route is generated, it is in principle a new type of route. The method is appropriate for generating instances of symbolic routes manually, but not to re-create them.

What is really required is a sequence automoton, with options for creating and recreating sequences that comes as close as possible to an ideal, symbolic sequence, and which furthermore can create these sequences on collections that are different is size as well as content and composition, and that does this in a robust fashion, such that the quality in the end-sequences only decreases proportionally with the collections usefulness relative to the symbolic sequence. That connection will also be advantageous to be provided tools for manually adjusting and manipulation the sequence through an adjustment of the route in the desired direction.

Both of these desired traits of sequence automotons will make the recipes for symbolic sequences useful on collections of elements that are similar to a certain degree and that share meta-data to this effect. Such collections already abound and will to an even great extend arise in connection with the global Internet, where both private, commercial and public databases will contain sets of metadata, through which users shall be able to navigate.

In the first instance, this is relevant for collections af music, which have penetrated the Internet, but in the near future there will be a need to be able to organised other types of elements in a similar way. None of the herein examined methods are capable of in an effective manner handle the pragmatic and use-oriented requirement for use on general/public collections, just as none of the examined methods take advantage of the new methods and new technical means detailed in the present patent document.

It is therefore the purpose of the present invention to detail a method, which among other things can, for each collection-element, provide instant access to qualitatively relevant alternatives, which offers means of dynamically adjusting the basic parameters for sequence production, which offers means of structured production and manipulation of sequences, and which make it possible to qualitatively interrelate collection-elements.

Overall, the invention thus concerns improvement of the method for production of sequences, and a subsequent extension of the possible forms of interaction and presentation. The improvement for sequence production includes means of generating match-lists from ordered sequence-templates of specifying ideal elements, where the match-lists are ordered by the degree to which the elements matcher the specifying ideal, whereby the whole collection of elementer is organised in relation to the sequence-template in it entirety, such that there for each specifying ideal element in the sequence-template is provided instant access to nearoptimal alternatives. The subsequent extension of the forms of interaction and presentation typically include providing means for clear overview presentation of and navigation among the elements of the endsequence in general and the adjoining match-lists of each element in particular.

Figuratively speaking, a map of the entire available collection of elements is produced and presented, upon which is recommendable route through the landscape is given, including sub-route alternatives for each stretch on route.

This is achieved, when the stated method is characterised by from a collection of elements EM and a from a set of templates SM chosen sequence-template SSf chiefly containing the ideal-elementer SSfIE1, SSfIE2, . . . . SSfTEn (where n signify det final number of template-elements), for each ideal-element SSfIEi (ordered in sequence beginning with SSfIE1) produce an ordered match-list Mj of all the elements in EM (MjE1, MjE2, MjE3 . . . MjEn, where n signify the final number of elements in EM), where the first list-element in Mj(MjE1) is nearest the ideal specified in SSfIEi, and where the other list-elements (MjE2, MjE3 . . . indtil MjEn) are successively further from the ideal specified in SSf1Ei, and that from each match-list Mj a selection is made of qualified candidates for an end-sequence based in rules hereof.

The advantages of this method is that it, even from limited sets of elements (collections), via a "recipe" or symbolic ideal-sequence can generate the under the circumstances most optimale ordered lists of solution-candidates, and that subsequently ordered landscape or "space" is created, which may serve for the final qualified sequence fine-tuning.

A further advantage is that the "recipes" in an of themselves are independent entities, that can be saved, edited, re-used, copied, exchanged, transmitted, etc. between users and professionals, and within user groups (user-to-user).

Appropriate realisations of the method behind the invention are specified in claims 1-9. The inventions also concern a computer-readable medium as specified in claim 10.

Furthermore, the invention concern an apparatus for production of sequences as specified in the opening of claim 11, which in accordance with the inventions is characterised by the specified construction of the characterising part of the claim. Appropriate realizations are specified in claims 12-19.

DETAILED DESCRIPTION

In what follows, the favored realisation of the invention will be described under reference to the drawings, where
 objects and classes are written in CAPS e.g. TEMPLATE object or objects of the class COLLECTION,
 attributes and methods are written in italics e.g. *loop* attribute or *getNext Element()* method, and
 values in attributes are given in quotes e.g. the value of attribute *value1* in object RULE is "group3".

The diagrams in FIGS. 2, 3, 4, 5, 6, 7a, 8 follows the standard UML Unified Modeling Language, as specified in e.g. *The Unified Modeling Language Reference Manual (UML)* by J. Rumbaugh, G. Booch, and A. Jacobson, ISBN: 020130998X, Addison-Wesley, 1998. The UML standard is the de facto standard for professionals in the IT-systems- and software-development profession the world over, and serves as concrete instructions as to the realization of the invention.

It is known and accepted praxis within IT-systems- and software-development, that class-diagrams based on e.g. UML serves to represent information and method types as well as relations among them, and that instances of said classes are signified as "objects", those concrete information holders, that under the execution of the software are stored for manipulation and processing in the computer-readable medium.

That an object of a class has a relation to an object of another class is specified in class diagrams with an arrow. In the case of an object that has relation to one and only on object of the other kind, the relation is said to be a "1-to-1" relation. A "1-to-1" relation is represented by a reference implied by the arrow. In the case where an object knows—is related to—more than one of the other type of object, the relation is known as a "1-to-many" relation. Such cases necessitate a multitude of references, which are typically handled via a table—a so-called reference-table or a list-structure. Both forms are independent structures, which may be supported directly in the chosen programming language/ environment.

In this patent document, tables are considered as internal representation in the computer, and this is indicated by the ending square-brackets ("[]"), e.g. myArray[]: element. This specifies that an object knows multiple objects of the class ELEMENT and has organised them in a table (in this case myArray[]). In different to this, lists are considered not to be a part of programming language. Therefore, the two classes HELPLIST and HELPLISTLINK are introduced to handle various lists:

In the case of two objects that both know of multiple of each other's kind, the relation is known as a "many-to-many" relation. These relations are special if there is a unique significance to each relation. The organisation of such relations can be successfully achieved by specifying a third object, a so-called association-object. The structure is specified by an arrow between the two original classes of objects with the third object attached. Association-object contains implicit reference to one of each of the other objects. References of this kind are most often specified as follows: the association-objects "knows the key" to the other objects.

When in the following the expression "has knowledge of" is used to characterise systemic relations between objects (e.g. objects A and B), it is taken to typically signify that provided both objects are stored in the computer-readable medium (under program execution), then it is possible to instruct on object (e.g. object a) to read and manipulated aspects of the other object (e.g. B), or to initiate functions and methods of that other object. This means, as a concrete example, that when in the following it is written that "the ENGINE object knows of the a list of ELEMENT objects by using the COLLECTION object's method getAllList()", then the idea is that the ENGINE object makes a program-call to the COLLECTION object—both of which are stored in the computer-readable medium—with the syntax collection.getAllList(), whereby the data-set which the COLLECTION object has access to becomes accessible to the ENGINE object in virtue of having been stored in a dedicated part of the computer-readable medium or by a dedicated reference hereto (similarly stored).

When in the following it is specified that an object, a result or a reference-table etc. is "stored", this is commonly and typically synonymous to temporarily storage in the computer-readable medium.

When in the following the concepts "likeness", "similarity" and "distance" are used, the meaning is a follows: "likeness" is a perspective concerning commonalities of things in general. "Similarity" is a more specific focusing on the degree to which things are or are not alike. Finally, the degree of likeness and similarity can be qualitatively captured using the concept "distance $\Delta$". All these concepts thus encircle traits of the same phenomenon, albeit with a difference with respect to focus and granularity. The concepts are utilized in what follows to heighten understanding of the invention

OVERVIEW OF FIGURES

FIG. 1 presents an example of a user-interface (101) to an apparatus in accordance with the invention.

Figure 2:
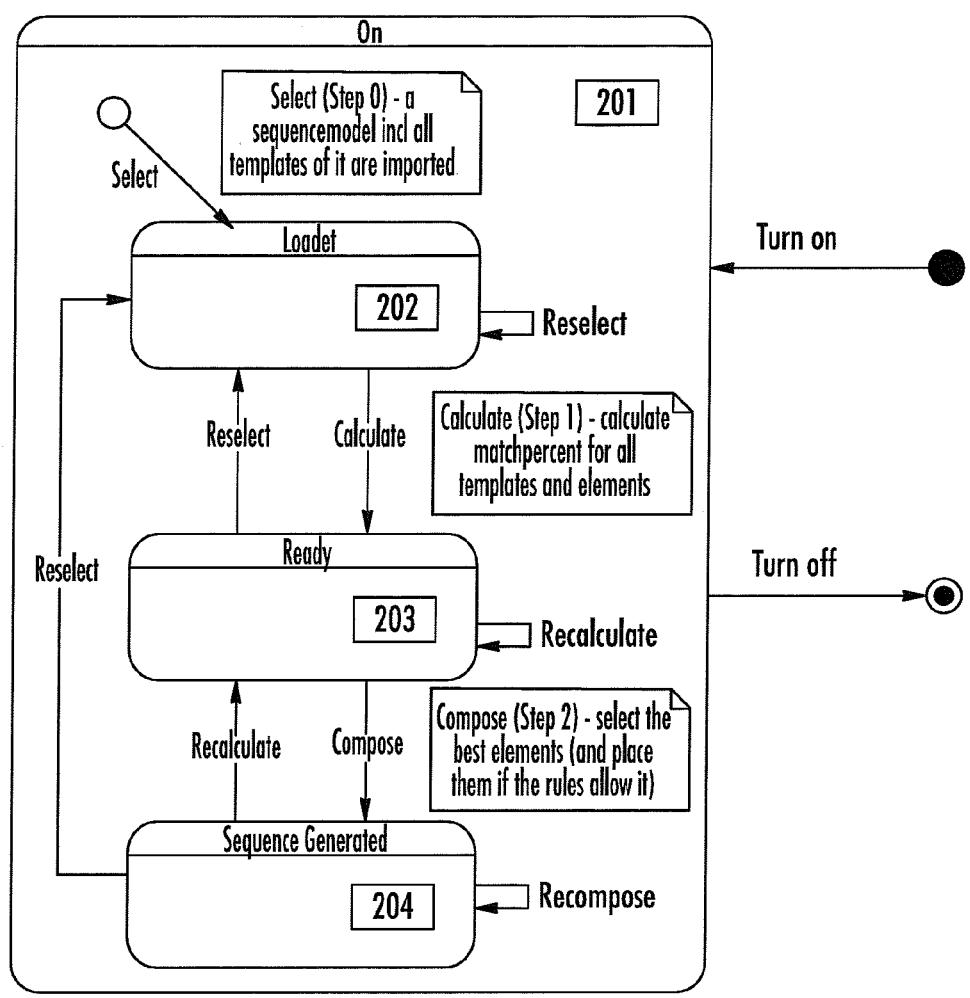

FIG. 2 presents an overview diagram of states that the apparatus (201) can be in, with adjoining specification of actions leading to state-changes.

Figure 3:
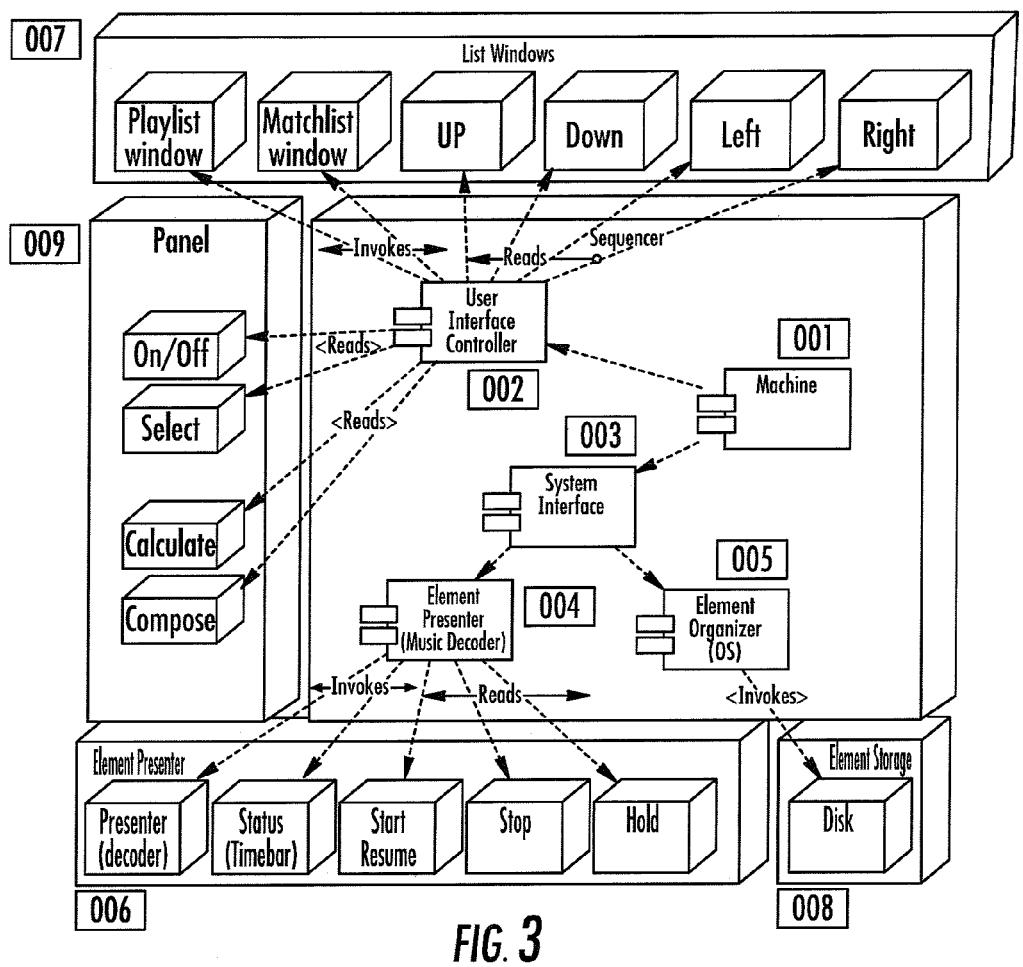

FIG. 3 presents a schematic of an apparatus in accordance with the invention, including interface-elements (002) and technical software-objects grouped into components (003, 004, 005), where that which specifically characterize the invention is placed in the MACHINE component (001).

Figure 4:
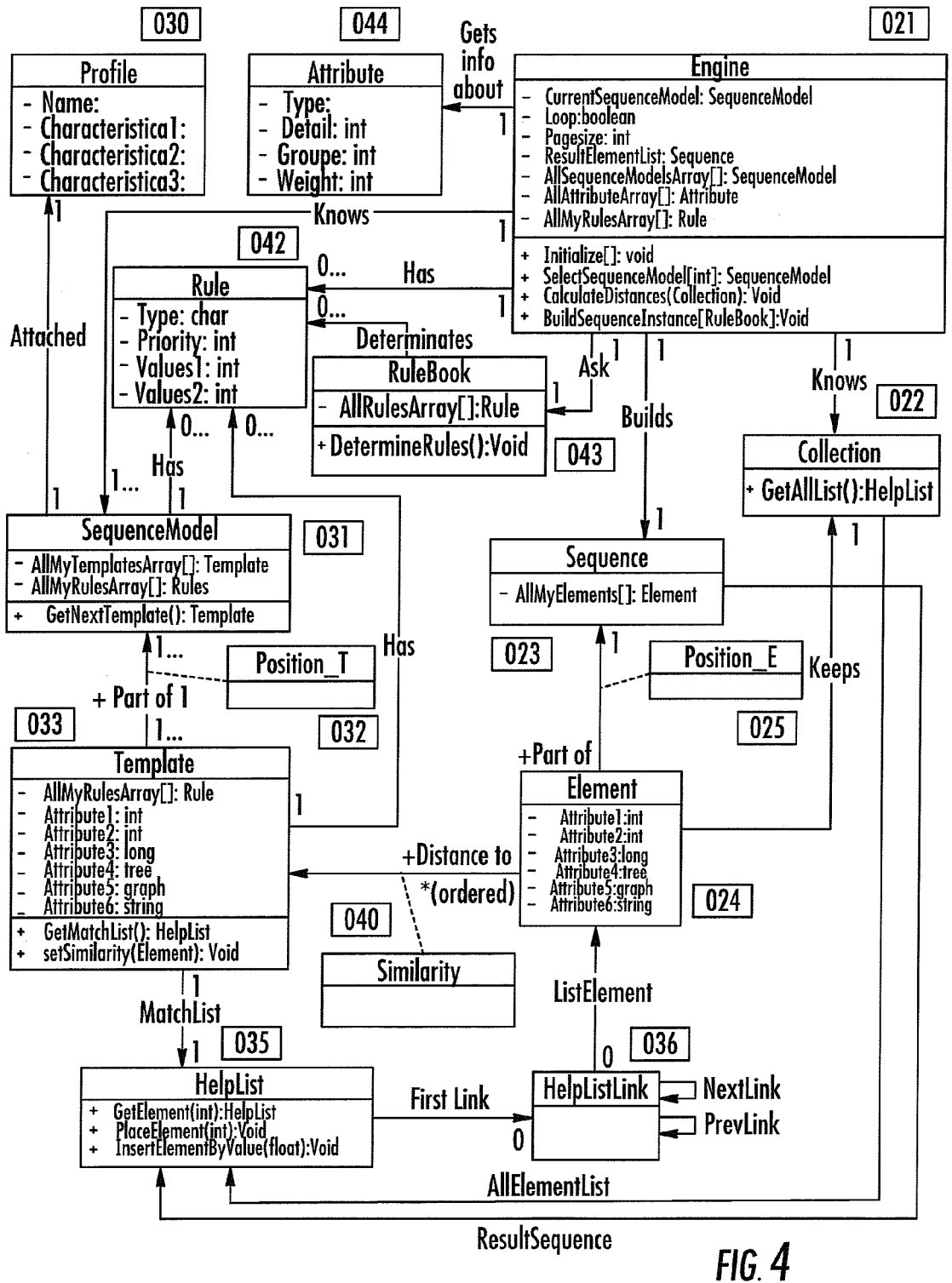

FIG. 4 presents those of the inventions characteristic technical means and their relations in the form of a class-diagram depicting the technical software-objects and related associations in the MACHINE component (001 in FIG. 3).

Figure 5:
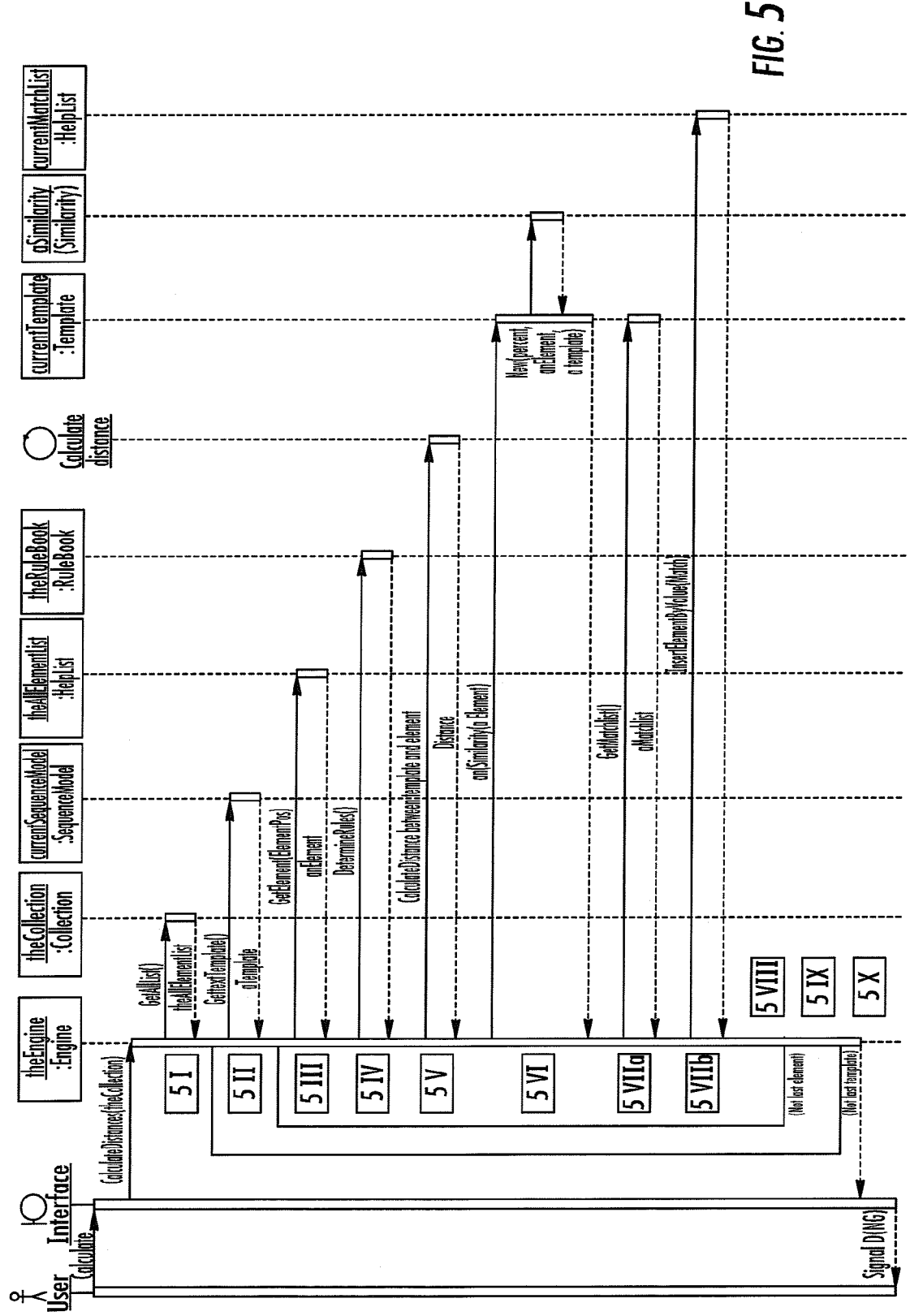

FIG. 5 presents the collaboration between the various technical software-objects in the form of an interaction-diagram in connection with step 1 "constructing the match matrix" according to the invention.

Figure 6:
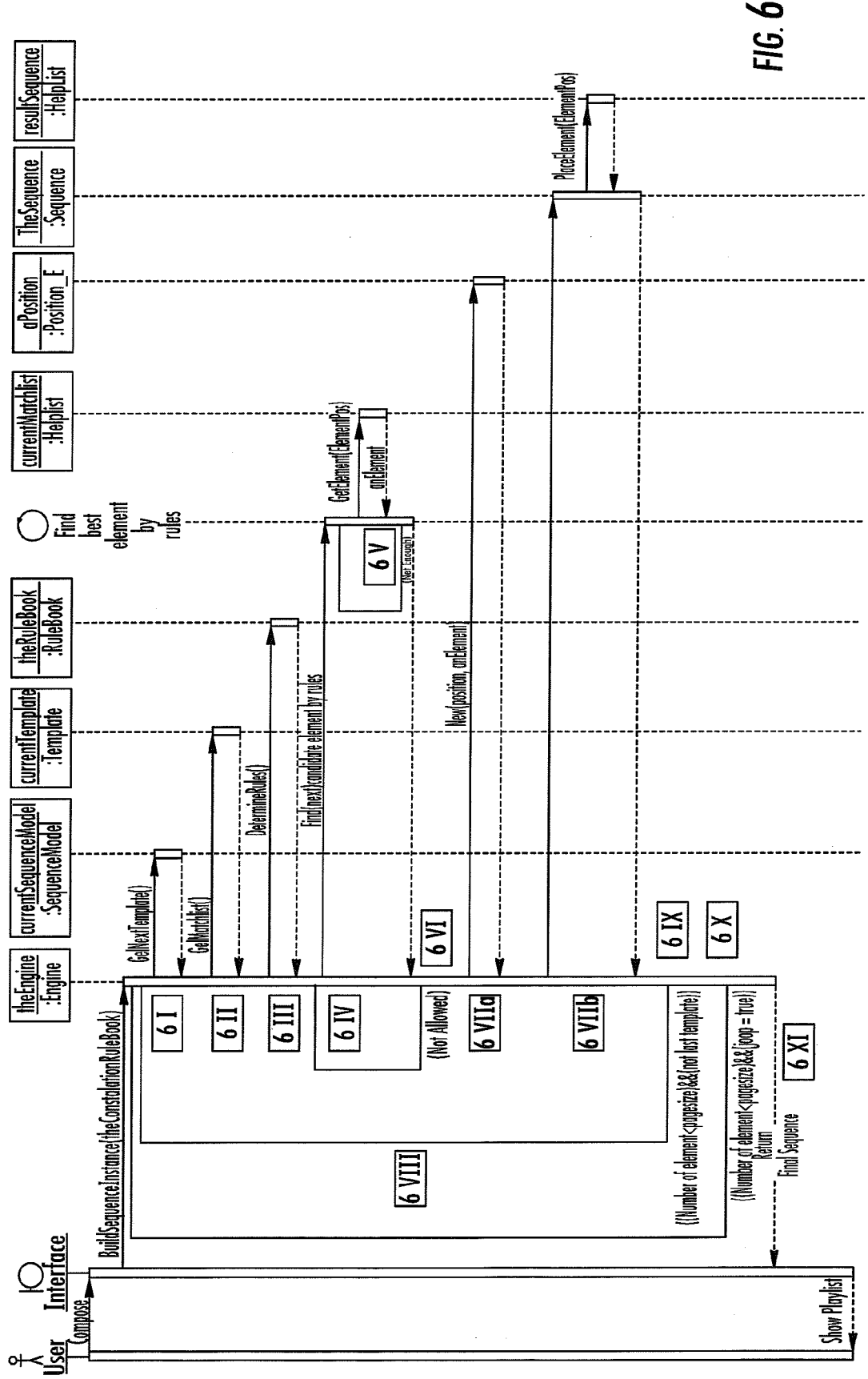

FIG. 6 presents the collaboration between the various technical software-objects in the form of an interaction diagram in connection with step 2 "elicit a qualified candidate sequence" according to the invention.

Figure 7A:
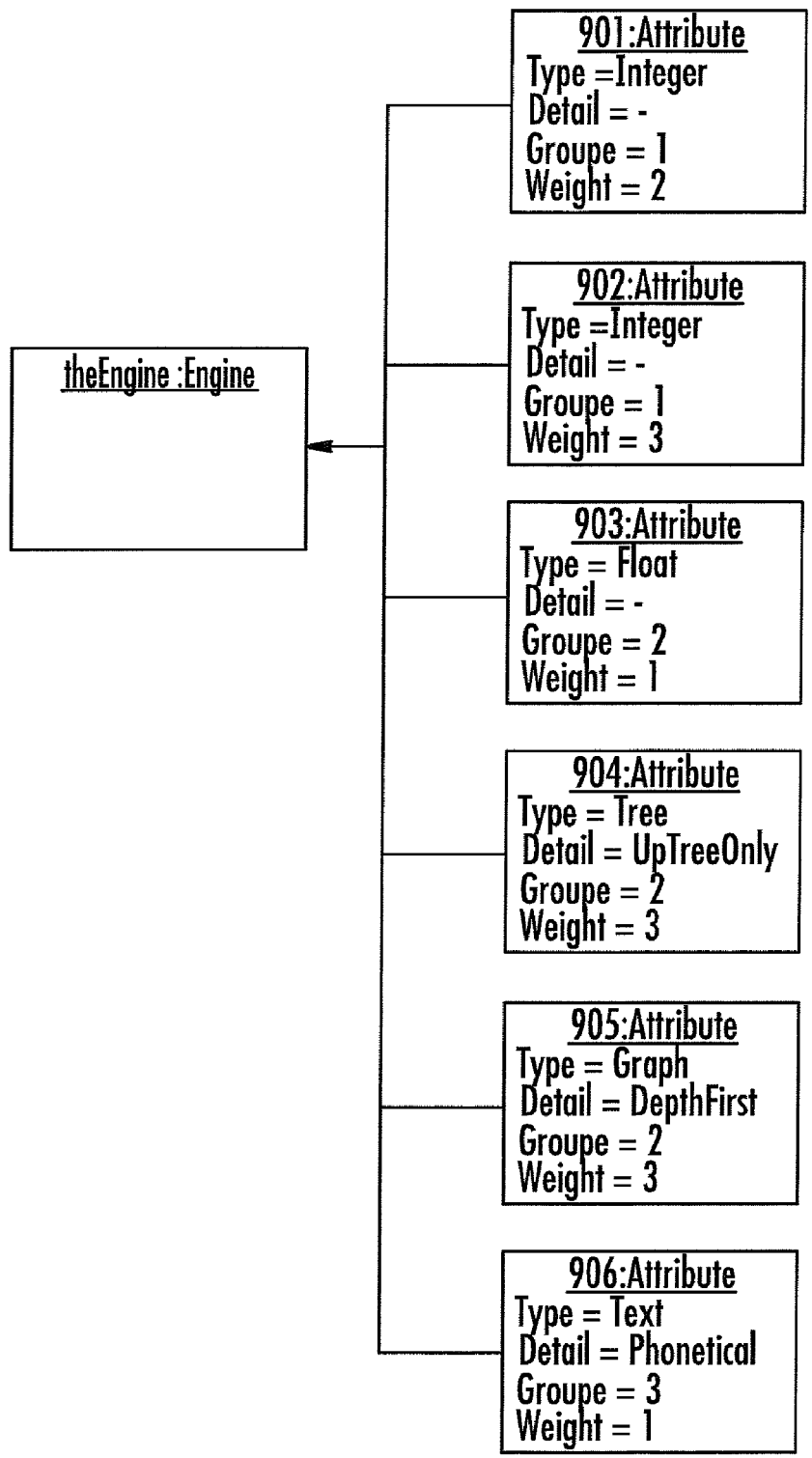

FIG. 7a presents an example of a set of ATTRIBUTE objects to one instance of the invention.

Figure 7B:
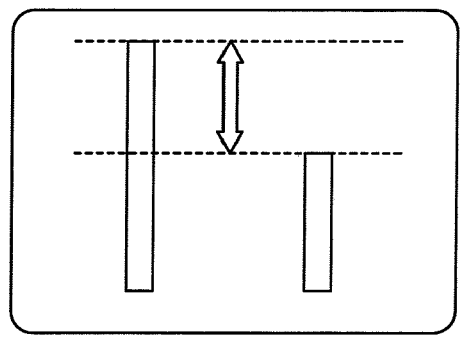
Figure 7B:
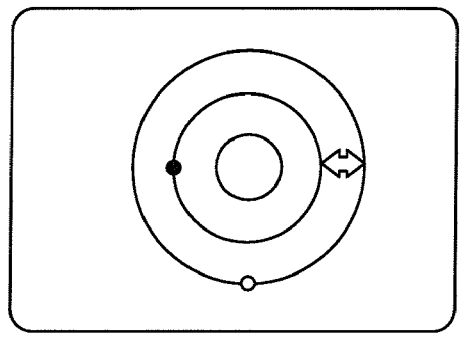
Figure 7B:
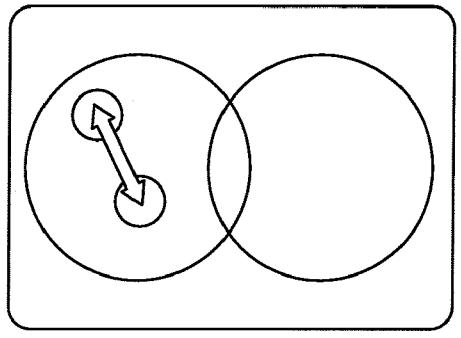
Figure 7B:
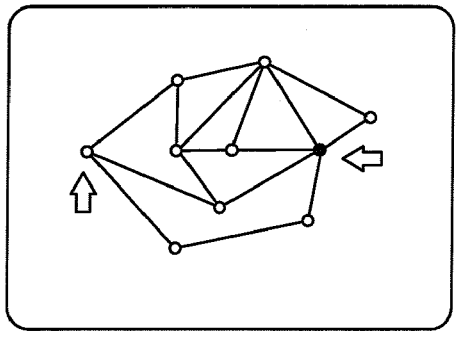
Figure 7B:
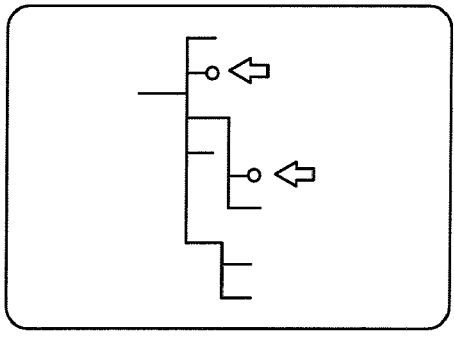
Figure 7B:
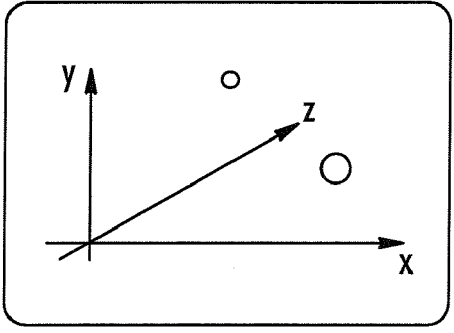
Figure 7B:
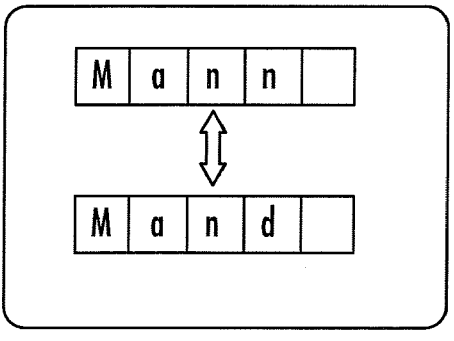
Figure 7B:
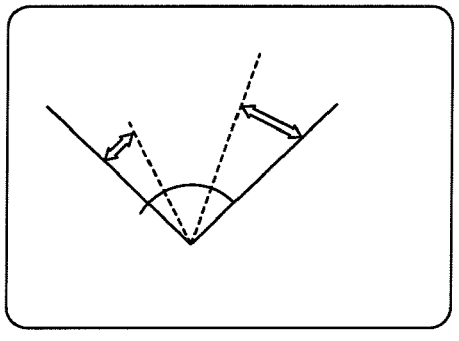

FIG. 7b presents eight examples of geometrical depictions of distance between elements.

Figure 8:
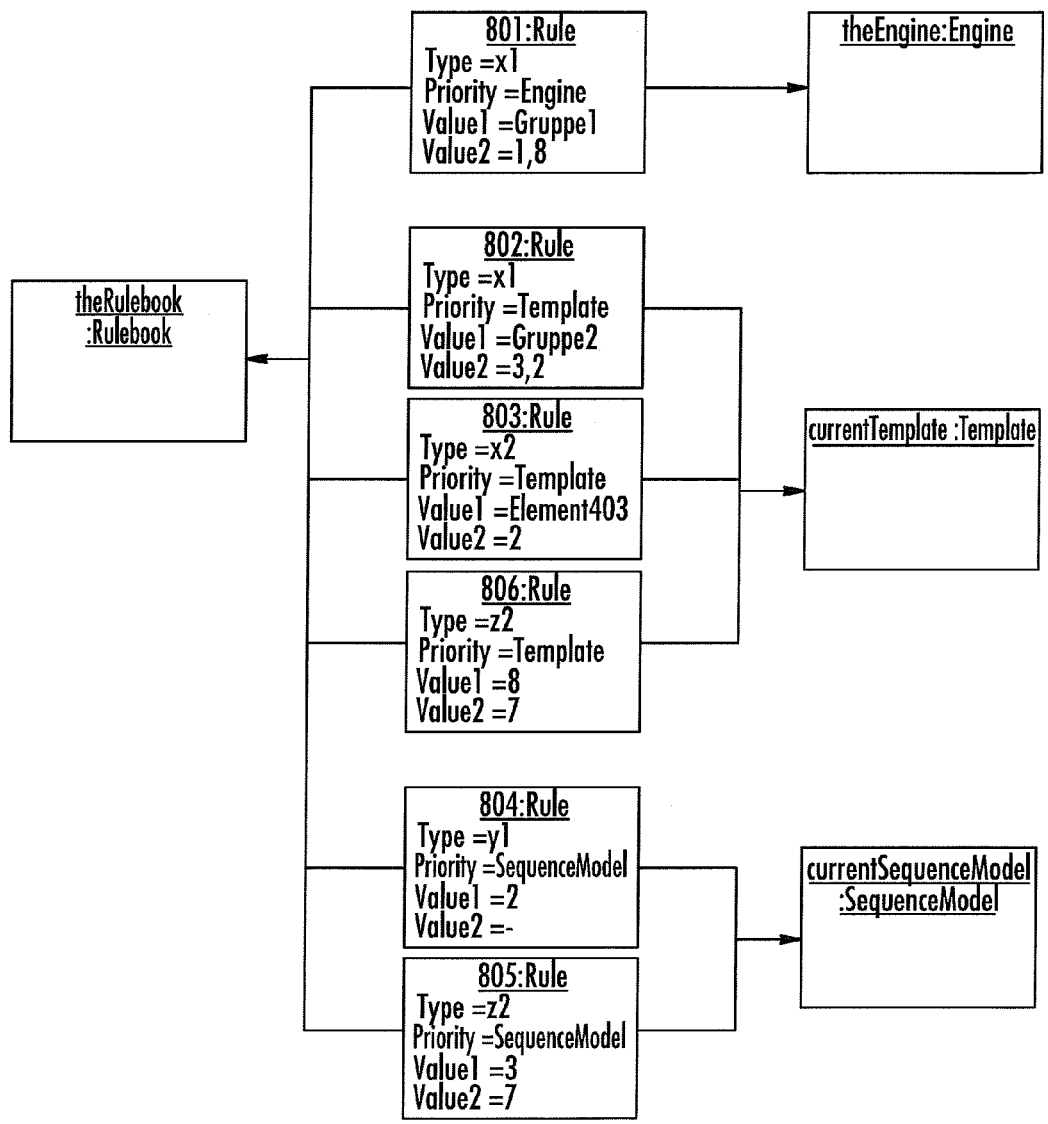

FIG. 8 presents a set of RULE objects of one instance of the invention, where one example of a series of SEQUENCEMODEL objects with adjoining TEMPLATE objects are loaded into a concrete instance of the invention.

FIG. 1 Example of a user-interface to an apparatus according to the invention.

In FIG. 1 an example of a user-interface to an apparatus according to the invention is specified. The figure contains a window (101) with a SELECT drop-down box (102), wherefrom the sequence-model can be specified from a list. By pressing the SELECT button (103), the user selects the sequence-model of his or her choice. Afterwards, the user can press the CALCULATE button (104) which initiates a basic sequence-calculation (of distanced $\Delta$ and similarity, see below), and the user can then press the COMPOSE button (105) to generate a specific result-sequence to be displayed in the FINAL SEQUENCE textbox (105).

The state of the system is dynamically displayed in the STATE (106) textbox. Until such time as a necessary state is obtained, the related buttons are disabled, wherefore a CALCULATE action shall be preceded by a SELECT action, just as a COMPOSE action shall be preceded by a CALCULATE action. Said states are described in detail below.

FIG. 2 present a diagram of the states the apparatus can be in

The four man states, which the apparatus according to the invention can be in, are specified in FIG. 2.

State: ON

When the apparatus is switch on, the basic objects are loaded (as described below). In the computer-readable medium, pre-specified instances of the classes—the objects—are created, and these objects are consequently initiated (that is, they are assigned the starting value that their definition dictates or a value dictated by the program that initiates them). This includes assigning pre-specified internal relations among objects. The state ON is achieved.

At this stage it is possible to select a sequence-model (in accordance with the description of FIG. 1 above).

State: LOADED

When a sequence-model for the apparatus has been selected, this will be represented by a series of instantiated SEQUENCEMODEL objects and TEMPLATE objects in the computer-readable medium. The state LOADED is achieved.

At this stage it is possible to perform the a calculation of likeness (from distance Δ) between element and ideal-element, a process signified as Step 1 in what follows and especially in connection with the explanation of FIG. 5. The actual calculation is controlled by the ENGINE object, as explained in connection with the description of FIG. 4 below.

State: READY

When all likenesses (distances Δ) between idealelement and each element in the collection have been calculated, a match matrix is constructed (and consequently stored in the computer-readable medium), and this can be utilized to the final generation of the end-sequence. The state READY is achieved.

It is possible at this stage to generate a well-formed sequence in accordance with the invention, a process signified as Step 2 in what follows (and especially in connection with the description of FIG. 6 below).

State: SEQUENCE GENERATED

When an instance of an end-sequence has been generated in accordance with the invention, this end-sequence is made available to related parts of a possibly larger system (environment), for instance as the one specified in FIG. 3.

The state SEQUENCE BUILD is achieved.

FIG. 3 Schematic of an apparatus in accordance with the invention.

FIG. 3 presents a schematic of an apparatus in accordance with the invention.

In a computer-readable medium, a series of components are stored: the MACHINE (001) component, which contains the technical means to make the invention work as intended, a USER INTERFACE (002) component, that handles the communication to the parts of the apparatus which the user experiences and interacts with, a SYSTEM SURFACE component (003), which handles the communication to other systems including a ELEMENT PRESENTER interface to e.g. a player of media-files, and an interface to an external storage medium ELEMENT ORGANIZER INTERFACE component (005) e.g. Linux or Windows2000.

A user-interface is also shown: the ELEMENT PRESENTER system with e.g. a START and A STOP button, which is read by the ELEMENT PRESENTER INTERFACE component which in turn via the SYSTEM INTERFACE component makes it possible for the MACHINE component to know what the user wants to do with respect to the appearance of the elements.

In an extended form of the invention it is possible to manipulated the generated end-sequence via A LISTWINDOW interface, where the result of the inventions proceedings is displayed and can be interacted with e.g. via UP and DOWN buttons, to change the elements relative position.

The critical buttons are placed in a PANEL interface. These are the ON/OFF, LOAD, CALCULATE, COMPOSE buttons, which are all read and handled by the USER INTERFACE CONTROLLER component, which in turn is read by the MACHINE component so that this may carry out the tasks in accordance with the users instructions.

A detailed description of the MACHINE component is given in connection with FIG. 4.

FIG. 4 presents a class-diagram of the technical means in terms of object-classes and their relationship.

One or more instances of objects of the following classes are at a specific time created and stored in the computer-readable medium:

| Object(s) of class | Purpose/Function/Effect | Knowledge of objects of class |
|---|---|---|
| ENGINE (021) | The primary conductor; initiates and handles regulation of activity of objects from all other classes. I connection with calculation of degree of likeness (distance), the ENGINE object uses information from the ATTRIBUTE objects concerning how likeness is determined. The ENGINE object has rules concerning the selection and composition associated in the form of RULE objects. | COLLECTION SEQUENCE RULEBOOK ATTRIBUTE RULE |
| COLLECTION (022) | Controls all elements in the collection. Can deliver a list of all elements, if requested. | ENGINE ELEMENT HELPLIST |
| ELEMENT (024) | Contains a reference to an element and information about the element via its attributes. Knows the degree of its own likeness/difference in relation to all ideal-elements SIMILARITY objects. | SEQUENCE POSITION_E TEMPLATE SIMILARITY |
| HELPLIST (035) | A help-class used by COLECTION, TEMPLATE and SEQUENCE objects to hold lists of ELEMENT objects. | HELPLISTLINK |
| HELPLISTLINK (036) | A help-class used when building lists of ELEMENT objects. Used by objects of HELPLIST class. Refers to an ELEMENT object. | HELPLIST ELEMENT |

-continued

| Object(s) of class | Purpose/Function/Effect | Knowledge of objects of class |
|---|---|---|
| POSITION_E (025) | Handles and controls the position of each ELEMENT object in the end-sequence. If the same ELEMENT object appears twice in the end-sequence, there exist two appropriate POSITION_E objects. | SEQUENCE ELEMENT |
| SEQUENCE (023) | Handles and controls the end-sequence, including a list containing the sequence's elements in the correct order. | ENGINE POSITION_E ELEMENT HELPLIST |
| PROFILE (030) | Contains information about the SEQUENCEMODEL in question e.g. information about its use and origin. | SEQUENCEMODEL |
| SEQUENCEMODEL (031) | Contains a series of ideal-elements in the form of TEMPLATE objects, whose position is known via POSITION_T objects. SEQUENCE objects have associated rules about selection and composition in the form of RULE objects. | ENGINE PROFILE TEMPLATE POSITION_T RULE |
| TEMPLATE (033) | The expressive idealelement that all ELEMENT objects are compared with and against which the distance Δ is calculated and stored in a SIMULARITY object. The TEMPLATE object's attributes accord with those of the ELEMENT object and are described via ATTRIBUTE objects. | SEQUENCEMODEL RULE POSITION_T SIMILARITY ELEMENT HELPLIST |
| POSITION_T (032) | Handles and controls the position of each TEMPLATE object in the end-sequence. If the same TEMPLATE object appears twice in the end-sequence, there exist two appropriate POSITION_T objects. | SEQUENCEMODEL TEMPLATE |
| SIMILARITY (040) | Handles and controls the degree of likeness between ELEMENT objects and TEMPLATE objects. ELEMENT objects as well as TEMPLATE object can appear more than once, but only once at the same time. | ELEMENT TEMPLATE |
| RULE (042) | The container of information about the procedure for selection and composition of ELEMENT objects. | ENGINE SEQUNCEMODEL TEMPLATE |
| RULEBOOK (043) | Determines which rules apply when and provides these to the ENGINE object. | RULE ENGINE |
| ATTRIBUTE (044) | The container of information about how the different attributes can and shall be compared in connection with the calculation of the degree of likeness. | ENGINE |

In the following a descriptions is given of the respective classes and their interrelations.

Basic Classes

In FIG. 3 the class ENGINE (021) is specified. A single object of this class is the overall conductor, controlling the procedure for commitment and activity of other objects of the other classes. The ENGINE object knows an object of the class COLLECTION (022), with contains information about the known elements.

Each known elements have associated their own object of the class ELEM (024). ELEMENT objects are organised in a list of the class HELPLIST (035), which the COLLECTION object refers to via the AllElementList reference.

A HELPLIST object can collect and place elements in relation to its position in a list via objects of the class HELPLISTLINK(036) via the methods GetElement() and PlaceElement(). A HELPLIST object can also place an ELEMENT object in relation to a numeric value using the method insertElementByValue().

The ENGINE objects main function is to create an order of ELEMENT objects. This result is constructed via objects from the class POSITION_E (025) and an object of the class SEQUENCE (023). An ELEMENT objects position is stored in the form of an object of the class POSITION_E, which contains a reference to the specific ELEMENT object and information about its position. Alternatively, an instance of the HELPLIST class is also found, and this can handle lists of ELEMENT objects. This instance is referred to as playlist from the SEQUENCE object.

Beyond initialisation etc., the ENGINE object use two steps to calculate the optimal order: Step 1 CalculateDistance(), described in connection with the explanation of FIG. 5, and Step 2 BuildSequenceInstance(), described in connection with the explanation of FIG. 6.

Match-Specific Classes

The ENGINE object has knowledge of all create objects of the class SQUENCEMODEL (031) via a table of references. The SEQUENCEMODEL objects' tasks are to function as ideal models, SEQUENCE object instances of which are requested. The ENGINE object gets knowledge of list of ELEMENT objects by using the COLLECTION objects method getAllList()

An object of the class PROFILE is related to each SEQUENCEMODEL object and contains information about the specific SEQUENCEMODEL object's name, characteristics and format, including origin and use.

A SEQUENCEMODEL object has via a table of references associated a series of objects of the class TEMPLATE (033), which further more is placed in order via objects of the class POSITION_T. A TEMPLATE object's position is stored in the form of an object of the class POSITION_T (032), which contains the key to the TEMPLATE object in question, the key to the SEQUENCEMODEL object in question and information about its position. A SEQUENCEMODEL object can gather the next TEMPLATE object via method the GetNextTemplate().

To each TEMPLATE object is created an object of the class SIMILARITY (040) to all ELEMENT objects. An ELEMENT object's match-value in relation to a TEMPLATE object is determined by a concrete calculation of distance Δ—also called distance or likeness (040)—between the attributes in the TEMPLATE and the attributes in the ELEMENT object. The ENGINE object gathers information for this operation in the ATTRIBUTE object via its AllAttributeArray[]. The calculations of distance Δ are explained further in connection with the explanation of FIG. 7a and FIG. 7b below.

An ELEMENT objects match-value in relation to a TEMPLATE object is stored in the form of an object of the class SIMILARITY (040), which contains the key to the TEMPLATE object in question, the key to the ELEMENT object in question and information about its likeness (eng. "similarity") with the ideal-element.

Rule-Specific Classes

Both SEQUENCEMODEL objects, TEMPLATE objects and ENGINE object can have rules associated for composing ELEMENT objects in list-form to SEQUENCE objects. These rules are organised in the form of objects of the class RULE. Which rules apply when is determined by an object of the class RULEBOOK, which contains a table of references to all existing RULE objects. The RULEBOOK object offers functions to determine rules via method the DetermineRules(). If no rules apply, the ENGINE object picks the ELEMENT object with the highest degree of likeness—that is, the ELEMENT object with the lowest value for distance Δ. Determination and application of rules is described in detail in connection with the explanation of FIG. 8 below.

Initialisation and Select (Step 0)

To begin with, RULEBOOK objects, ENGINE object, SEQUENCE object are created and initialised.

Hereafter, a set of identified elements are loaded in each of their own object of the class ELEMENT, for instance as shown in Table 4a below.

TABLE 4a

| Elements ELEMENT | |
|---|---|
| EID | Name |
| 401 | Element01 |
| 402 | Element02 |

TABLE 4a-continued

| Elements ELEMENT | |
|---|---|
| EID | Name |
| 403 | Element01 |
| 404 | Element02 |
| ... | |
| 421 | Element21 |
| 422 | Element22 |
| ... | |
| 498 | Element98 |
| 499 | Element99 |

The COLLECTION object is initialised simultaneously, such that it among other things contains a reference to the purpose-build AllElementList list over all the identified ELEMENT objects. This is done by letting the initialisation-rutine processes all the ELEMENT objects, whilst also placing a reference to these in a list of the type HELPLIST object.

The ENGINE object is then initialised, such that it among other things contains a tabel AllSequenceModelsArray[] with references to all the loaded SEQUENCEMODEL objects. This is done by letting the initialisation-rutine process all the loaded SEQUENCEMODEL objects and insert references to them in each their place in the table. In a similarly way the AllAttributeArray[] table is initialised in the ENGINE object to contain references to all ATTRIBUTE objects.

Hereafter, one or more SEQUENCEMODEL object and one or more TEMPLATE object is loaded into the computer-readable medium.

The TEMPLATE objects' order in the SEQUENCEMODEL object is carried via POSITION_T association-objects (032), such that the same TEMPLATE object can appear in connection with more SEQUENCEMODEL objects, and such that more SEQUENCEMODEL objects can contain the same TEMPLATE object one or more times. It is flier known, which position (or positions, if it appears more than once) a TEMPLATE object has in the different SEQUENCEMODEL objects.

Table 4b below presents an example of three loaded SEQUENCEMODEL objects (101, 102 and 103), and six loaded TEMPLATE objects (301, 302, 303, 304, 305 and 306). The position of TEMPLATE objects in the different SEQUENCEMODEL objects is specified via the POSITION T objects (201, 202, 203, 204, 205, 206, 207, 208, 209, 210). From this example can be seen that the SEQUENCEMODEL object 101 has the following TEMPLATE objects in stated order: 305, 301, 304, 303, 306, 307, that the SEQUENCEMODEL object 102 has the following TEMPLATE objects in stated order: 310, 309, and that the SEQUENCEMODEL object 103 has the following TEMPLATE objects in the stated order: 305, 308, TABLE 4b

| Sequencemodels | |
|---|---|
| SEQUENCE MODEL | |
| sID | Name |
| 101 | Sequence 1 |
| 102 | Sequence 2 |
| 103 | Sequence 3 |

TABLE 4b-continued

Sequencemodels

POSITION T

| ptID | tID | sID | Position |
|------|-----|-----|----------|
| 201 | 304 | 101 | 3 |
| 202 | 303 | 101 | 4 |
| 203 | 302 | 101 | 1 |
| 204 | 301 | 101 | 2 |
| 205 | 305 | 103 | 1 |
| 206 | 306 | 101 | 5 |
| 207 | 307 | 101 | 6 |
| 208 | 308 | 103 | 2 |
| 209 | 309 | 102 | 2 |
| 210 | 310 | 102 | 1 |

TEMPLATE

| Tid | Name |
|-----|------|
| 301 | Template1 |
| 302 | Template2 |
| 303 | Template3 |
| 304 | Template4 |
| 305 | Template5 |
| 306 | Template6 |

When a SEQUENCEMODEL is selected, e.g. as a result of a user selecting it using the SELECT button in the user-interface in FIG. 1, then the selected SEQUENCEMODEL object's AllSequenceModels table number is set to the CurrentSequenceModelID attribute in the ENGINE object.

FIG. 5 Step 1 CACULATE: constructing the match-matrix

When the degree of likeness is to be computed, e.g. as a result of a user having pressed the CALCULATE button in the user-interface in FIG. 1, the following happens:

The ENGINE object finds—via the table AllSequenceModels[] and via the CurrentSequenceModelID attribute—the current SEQUENCEMODEL object's reference. And again via this reference the required SEQUENCEMODEL.

I) The ENGINE object requests of the COLLECTION object a reference to the AllElementList lists of all the ELEMENT objects in the COLLECTION object via its GetAllList() method.

II) The ENGINE object requests of the SEQUENCEMODEL object a reference to the SEQUENCEMODEL object's first (thereon after the next) TEMPLATE object via its GetNextTemplate() method.

III) From the AllElementList is gathered the first (thereon after the next) ELEMENT object via the getElement() method.

IV) The ENGINE object requests the RULEBOOK object to decide whether rules for weighting shall apply. The RULEBOOK object examines which RULE objects are associated with the current TEMPLATE object, and which RULE objects are associated with the current SEQUENCEMODEL object, and which RULE objects are associated the ENGINE object itself (prioritised in stated order), such that the RULE objects associated the TEMPLATE object initially has the highest priority and the RULE objects associated the ENGINE object the lowest priority.

V) The ENGINE calculates the distance Δ between the current TEMPLATE object for each ELEMENT object in the AllElementList list from the COLLECTION object (this is elaborated in connection with the explanation of FIG. 7a and FIG. 7b below).

VI) The ENGINE object requests of the TEMPLATE object to store the result in a properly created SIMILARITY association-object via the method SetMatchPercent(aElement).

VII) Concurrently, the ELEMENT objects are inserted in a sorted list of ELEMENT objects to the current TEMPLATE object via the method InsertElementByValue (matchpercent). The result is a list sorted by least distance Δ (lowest value). The list is assigning the TEMPLATE object via the reference MatchList during initialisation. Notice that this is done of purely optimisation reasons, as it the sorting and ranking by similarity (distance Δ) that is amongst the most essential means to achieve the advantages in the later stages of processing, and which is therefore used repeatedly. It is not strictly necessary to perform these operations, but you do achieve not having to repeat the sorting for each of its successive uses in the matchlist.

VIII) Hereafter steps III) to VII) are repeated until there are no more ELEMENT objects.

Table 5a presents all the SIMILARITY objects (601, 602 ... 649, 650 ... 699) after the first TEMPLATE object (301) is handled in relation to all ELEMENT objects.

TABLE 5a

Similarity (from distance Δ)

SIMILARITY

| mID | tID | eID | Percent |
|-----|-----|-----|---------|
| 601 | 301 | 401 | 67 |
| 602 | 301 | 402 | 34 |
| 603 | 301 | 403 | 78 |
| 604 | 301 | 404 | 89 |
| 605 | 301 | 405 | 98 |
| ... | ... | | |
| 649 | 301 | 449 | 97 |
| 650 | 301 | 450 | 89 |
| ... | ... | | |
| 698 | 301 | 498 | 87 |
| 699 | 301 | 499 | 56 |

IX) Once a TEMPLATE object is processed, the ENGINE object continues to process the next TEMPLATE object in the exact same fashion via steps II) thru to VII). The ENGINE object repeats this until there are no more TEMPLATE objects related to the current SEQUENCEMODEL object.

X) The ENGINE object announces its successful completion to the interface, for instance by omitting an audio signal.

Once all the SEQUENCEMODEL objects' TEMPLATE objects are processed for all the ELEMENT objects related to the COLLECTION object, a (match) matrix has been created. An example of a match-matrix is presented in Table 5d.

TABLE 5B

| | Match-matrix | | | | | |
|---|---|---|---|---|---|---|
| SEQUENCE TEMPLATE | ELEMENT: SIMILARITY (%) | ELEMENT: SIMILARITY (%) | ELEMENT: SIMILARITY (%) | ELEMENT: SIMILARITY (%) | ELEMENT: SIMILARITY (%) | ELEMENT: SIMILARITY (%) |
| 301 | 405:98% | 449:97% | 450:89% | 404:89% | 498:87% | ... |
| 302 | 403:94% | 403:92% | 409:90% | 444:90% | 498:67% | ... |
| 303 | 432:94% | 401:94% | 409:90% | 444:90% | 486:67% | |
| 304 | 412:96% | 441:94% | 409:90% | 444:88% | 438:68% | |
| 305 | 453:96% | 444:95% | 409:88% | 444:87% | 456:67% | |
| 306 | 436:94% | 401:92% | 409:90% | 454:90% | 455:67% | |
| 307 | 473:98% | 488:92% | 489:90% | 444:90% | 434:67% | |

Thereafter, the ENGINE object makes use of the matrix generated to construct an optimal sequence based on the characteristics of the available collection. Then means to do so are specified in FIG. 6, which is explained in detail below.

FIG. 6 Step 2 COMPOSE: Creating a qualified sequence

6-I) The ENGINE object acquires—via the AllSequenceModeArray[] table—the current SEQUENCEMODEL object and requests a reference to the first TEMPLATE object via the GetNextTemplate() method.

6-II) From the TEMPLATE object, the ENGINE object requests a reference to the appropriate object's MATCHLIST via the GetMatchList() method.

6-III) The ENGINE object requests the rules for composition from the RULEBOOK object via the DetermineRules() method The RULEBOOK object examines which RULE objects are associated the current TEMPLATE object; and which RULE objects are associated the current SEQUENCEMODEL object, and which RULE objects are associated with ENGINE object itself (prioritized in stated order: the TEMPLATE objects first, then the SEQUENCEMODEL objects, and the ENGINE objects).

Examples of dynamic rules are detailed in connection with FIG. 8 below. From this it is made clear, for instance, that in virtue of the rule for randomTopset, it is possible to specify how many of the optimal element to select randomly from.

If no other rules are specified, the ELEMENT object with den optimal similarity is selected, and the process continues with VI). Otherwise the process continues with IV). A simple example is specified in Table 8a below.

6-IV) From the rules applicable for the current situation, one or more elements from the matchlist are selected.

6-V) Thereafter, one specific ELEMENT object is selected for processing e.g. randomly or in accordance with one the other rules.

6-VI) The specifically selected ELEMENT object is validated in accordance with rules e.g. whether the threshold for similarity (from distance Δ) is crossed. If the ELEMENT object does not fulfill the requirements (the rules), we continue with the next element in step 6-IV).

6-VIIa) The selected ELEMENT object is placed in the first free position in the new sequence via creation of a new object of the type POSITION E object.

6-VIIb) Simultaneously, the ELEMENT object is inserted in the listplaylist via the method PlaceElement() in the HELPLIST object.

6-VIII) The ENGINE object proceeds via the SEQUENSMODEL object to the next TEMPLATE object in line, and the steps 6-I) thru to 6-VII) are repeated with the one modification that the ELEMENT found id placed in the next position in the sequence (by creating yet another POSITION_E object containing the position 2 element, and so on).

6-IX) Proceeding continue until there are no more TEMPLATE objects associated the SEQUENCEMODEL object, or until the number of ELEMENT objects specified in the pagesize attribute is achieved, where pagesize stipulates the immediate computational scope (how many new element to sequence at a time).

6-X) If the loop attribute is set to "true" and all the TEMPLATE objects have been used, and pagesize is still not reached, then the process start from the beginning with the first TEMPLATE object.

The result is an infinite sequence of objects (elements) generated in element-sets of a value of pagesize.

6-XI) The sequence of elements generated is returned to the user-interface, which announces to the user that a result is available.

Hereby is acheived an optimal sequence in relation to requested from the identified collection of elements. Furthermore, it is achieved that a quality-ranked matrix of alternatives (ranked by similarity, that is: distance Δ) for each element, and this can be utilized in appropriate ways (to orient the user by graphical presentation, to preprocess to prepare for other sequence-variations, etc.).

The end-result of the collective proceedings can appear as the end-sequence specified in table 6a, where has been created a series of POSITION_E objects, that describe the ELEMENT objects placement in the sequence. The elements are furthermore placed in a list-structure with the name playlist, TABLE 6a

| | End-sequence POSITION E | | | |
|---|---|---|---|---|
| peID | Position | ELEMENT | Percent | Distance |
| 701 | 1 | 109 | 98 | 0 |
| 702 | 2 | 122 | 97 | 0 |
| 703 | 3 | 189 | 95 | 0 |
| 704 | 4 | 107 | 98 | 0 |
| 705 | 5 | 109 | 87 | 5 |
| 706 | 6 | 123 | 95 | 0 |

In a simple version of the invention, all attributes take on numeric values and the distance is determined by, for all attributes subtracting the values for the ideal-element from the values of the collection-element in question and keep the resulting value, for thereafter sum up all the values of the collection-element in question (to a value you could call the collection-elements distance, match-value or likeness with the ideal-element). The only rule that applies, in this simple version, is that the element with the shortest distance Δ is selected (see the explanation to FIG. 7a and FIG. 7b below).

In the following sections, details of computing likeness, similarity, distance (Δ) is further explained, as is how attributes are handled, and the handling and application of rules for more advanced versions of the invention.

FIG. 7a and 7b Examples of comparative data types and calculating distance (Δ)

As explain above, the matchlist (matrix) is generated, and from this an end-sequence is compiled, by firstly, for each collection-element in the element collection, calculate the for the meta-data-type appropriate and quantifiable distance Δ between the collection-element in the question and the ideal-element, and secondly, once all the collection-elements are processed for distance Δ, quality-rank the element in increasing distance to the ideal-element in question. The collection-element with the shortest distance Δ to the ideal-element will be first in line.

The calculation of distance Δ can be carried out using commonplace mathematical-logical operations on values the ideal-element's meta-data and the corresponding values in the collection-element's meta-data respectively.

In a typical example, the values in the ideal-elements' and the collection-elements' meta-data are simple numbers, for instance "97" for the ideal-element and "55" for the collection-element in question, and the value of distance Δ can be computed by subtraction (97 minus 55=42). It is commonly known that distances can be computed by traversing information represented in tree-structures, in graphs, in alphanumerical tables etc. (see FIG. 7b and the explanation below for examples hereof).

FIG. 7a presents an object diagram with the under initialisation created objects of class ATTRIBUTE. This configuration belongs to one example of an instance of the invention, which handles ELEMENT objects with this type of attribute.

The ENGINE object has in connection with initialisation has created an AllAttribute Array[] table, with the content and values as specified in Table 7a:

TABLE 7a

Attribute types ATTRIBUTE

| aID | Type | Principal | Group | Weight in Group |
|-----|------|-----------|-------|-----------------|
| 901 | Numeral | — | 1 | 2 |
| 902 | Numeral | — | 1 | 3 |
| 903 | Decimal | — | 2 | 1 |
| 904 | Tree-structure | UpOnly | 2 | 1 |
| 905 | Graph | DepthFirst | 2 | 3 |
| 906 | Text | Phonetic | 3 | 1 |
| ... | ... | | | |
| n | | | | |

Weights

Apart from attribute-type and information about they compare, the table also contains information about whether attributes belong to groups, and if so, how strongly they each are weighted within the group.

In connection with the dynamic rules it is possible to weight the different attribute-groups relatively. This is described in connection with FIG. 8 (under "group x").

Attribute-Match Table

In connection with the computation of distance Δ between a TEMPLATE object and an ELEMENT object, use is made of the AllAttributeArray[] table. This contains a description of which types of attributes that exist for each ELEMENT object and each TEMPLATE object respectively, as well as further requirements as to how the distance Δ calculation shall be performed.

The simplest attribute-type is numeral. Here distance Δ is determined by subtraction: If the TEMPLATE object's attribute-value is "55" and the ELEMENT object's attribute-value is "97", distance Δ is "42".

Other simple attribute-types include Boolean variables, floating point, and letters. More complicated attribute-types include text-strings and sentences. Other complicated types are tree-structures, graphs, vectors, and points or areas in geometric figures. But also all other types that may be the subject of computation and digital representation are valid candidates for distance Δ measurement or calculation.

FIG. 7b presents a geometric depiction of a series of attribute-types characterized and value-set by, e.g. the distance between two areas, the distance between two positions in a tree-structure, the distance between two text-strings, the molecular distance or the distance between to points in a graph.

In the simpler cases, computing distance is usually obvious and constrained; while for the more complicated types various computational options for match- and distance-operations invite themselves. In cases with strings of characters and text, it may be necessary with further requirements as how to determine distance—does it, for instance, require exact character-for-character mapping, or are parts of words and sentences sufficient. Similarly in the case of the tree-structure where it is important to known whether distances measuring and matching may proceed upward, downward or bi-directionally.

To accommodate this, the present invention allows that the ENGINE object can challenge the match-table for information about further specifying requirements, when two attributes are to be compared and computed for distance. The figures contained within FIG. 7b (FIG. 7b-I thru to FIG. 7b-VIII) specifies examples of varying distance-conditions, and the explanations below make it clear why it in many cases is necessary to cater for further specifying requirements when measuring and computing distance Δ:

FIG. 7b-I presents an example with two columns of different heights. It is in this case possible to calculate Δ by either subtracting the value given by the right columns (in relation to a given unit of measurement) from the value given by the left column (in relation to the same unit of measurement), or by subtracting the area covered by the right column (in relation to a given unit of measurement) from the area covered by the left column (in relation to the same unit of measurement).

FIG. 7b-II presents an example of two circular areas contained in one of two larger areas, where one complete circumscribes the two. It is in this case possible to calculate Δ by subtracting the relative position of one of the areas from the relative position of the other area relative to either a fixed point in the circumscribing (left) area or relative to a fixed point in the neighboring area (to the right).

FIG. 7b-III presents an example of two elements placed in a tree-structure, where one element (○) is located in the first branching of the tree and the other element (●) is located in another branching of the tree. It is in this case possible to calculate Δ by, starting from the trees "root" (furthest to the left in the figure), either counting the number of branches for each element and subtract the two values, or by subtracting the value of the total distance of the lines that connect one element to the root from the value of the total distance of the lines that connect the other element to the root.

FIG. 7b-IV presents an example of two character-strings "Mann" and "Mand". It is in this case possible to calculate Δ from an onset in phonetic analysis (where each string, when spoken, has a measurable pitch to compute from, e.g.) or an onset in alphabetic analysis (where each character is assigned a numeric value from the ASCII-table, e.g.).

FIG. 7b-V presents an example of two elements (○) and (●) placed in "orbits" on each circle, where the element (○) circle complete circumscribe the element (●) circle, and where element (●) complete circumscribe an inner circle (a core). It is in this case possible to calculate Δ by either simply measuring the distance between the elements' respective orbits, or, with an onset in the elements representing chemical molecules, and by consulting appropriate reference tables, calculate the molecular distance.

FIG. 7b-VI presents an example of two elements (○) and (●) placed in a network of element. It is in the case possible to calculate Δ by either subtracting the collective shortest distance of one of the elements in relation to all the other elements (for instance by linear distance or by the number of intersections in the network) from the collective shortest distance the other element has to each of the other elements, or by subtracting the distance between the elements using a specific other element in the network.

FIG. 7b-VII present an example of two elements placed in a three-dimensional system, where one element (the leftmost) appear smaller than the other since it is deeper in the "space" of the system. It is in this case possible to calculate Δ either by subtracting the figurative extend of one of the elements (in relation to a chosen unit of measurement) with the figurative extend of the other element (in relation to the same unit of measurement), or by starting from a fixed point in the space, measuring the distance (in relation to a chosen unit of measurement) from the fixed point to one element and the distance from same fixed point to the other element (in relation to the same unit of measurement) and subtract the two values.

FIG. 7b-VIII presents an example of two lines (dotted) placed in relation to a straight angle (defined between the two other unbroken lines). It is in this case possible to calculate Δ by subtracting the respective gradient or angular that the two dotted lines have to the straight angle.

FIG. 8 Example of object-diagrams for RULE objects

FIG. 8 presents an overview of the set of rules applicable at a certain time in a certain loading of SEQUENCEMODEL objects in a certain instance of the apparatus in accordance with the invention. The figure should be such that the RULEBOOK at this time has knowledge of only the specified rules 801, 802, 803, 804, 805 and 806, and that rule 801 applies to the active ENGINE object, that rule 802, 803 and 806 applies to the active TEMPLATE object, and that rule 804 and 805 applies to the active SEQUENCEMODEL object FIG. 8 thus presents the result of the RULEBOOK object's processing, since the RULEBOOK object has examined which rules apply at this particular time. This is achieved by having the RULEBOOK object make appropriate request to the current SEQUENCEMODEL object, the current TEMPLATE object, the current ELEMENT object, and by having the RULEBOOK object from the onset having requested of the ENGINE object which rules it has associated.

Rules, their values and type/group are read into a table, the contents of which are presented in Table 8a.

There exist three groups of rules with potentially more types in each. The three groups are (x) rules for weighting when computing distance Δ, (y) rules for selecting after distance Δ computation, and (z) rules for composing elements into end-sequences after selection. Rules can be applied in both Step 1 (group x) and Step 2 (group y and z) in relation to the detailed description of FIG. 2, FIG. 5 and FIG. 6 above.

Table 8a should be read as follows:

There exists a rule 801 of type x1, which is associated the ENGINE object, and which stipulate that attributes of "group1" shall be weighted the value "1,8".

And there exist a rule 802 of type x1, which is associated the TEMPLATE object, and which stipulate that attributes of "group2" shall be weighted the value "3,2".

Or that there exist a rule 805 of type z2 associated the SEQUENCEMODEL object, which stipulate that the distance to the previous ELEMENT object in the end-sequence shall be at least "7" positions if the value of the attribute number "3" contains the same value.

TABLE 8a

Examples of Rules
RULE

| RID | Type | Priority/Attached | Value1 | Value2 |
|-----|------|-------------------|--------|--------|
| 801 | x1 | Engine | Group1 | 1, 8 |
| 802 | x1 | Template | Group2 | 3, 2 |
| 803 | x2 | Template | Element403 | 2 |
| 804 | y1 | Sequencemodel | 2 | — |
| 805 | z2 | Sequencemodel | 3 | 7 |
| 806 | z2 | Template | 8 | 7 |
| ... N | ... | | | |

Below are typical examples of rules, which an apparatus in accordance with the invention can accommodate and utilize. If the same type of rule applies to more than one kind of objects, the order of priority comes in play: ELEMENT, TEMPLATE, SEQUENCEMODEL and ENGINE, where the ELEMENT object's RULE objects are considered the strongest and therefore overrule the others, and where the TEMPLATE is weaker than ELEMENT, but stronger that all others, and so on:

Attribute-group weights (type x1): The rule stipulates that an attribute-group is weighted differently than others, where the strength or degree of the weight depends on the value in the value2 attribute.

Personal preference specified (type x2): The rule stipulates that certain ELEMENT object's match is strengthened by a weight set by the user, where the strength or degree of the weight depends on the value in the value1 attribute.

Personal preference collected (type x3). The rule stipulates that certain ELEMENT object's match is strengthened by a weight collected by the system based on the user's system-usage, where the degree of the weight depends on the value of the value1 attribute.

Random Topset: (type y1). The rule stipulates that what is selected is not the most optimal ELEMENT object, but the top-set of optimal ELEMENT objects in the matchlist, where the extend of the top-set is specified in the value of the value1 attribute.

Min.match Percent (type y2): The rule stipulates that an ELMENT object shall pass a minimumsmatch percent (that is, a threshold for Δ) to qualify, where the threshold is specified in the value1 attribute.

Distance: (type z1): The rule stipulates that a certain number of other (different) ELEMENT objects must have been selected before an ELEMENT object may occur again, where the number is specified in the value of the value1 attribute.

Attribute-value distance (type z2): The rule stipulates that a certain number of other ELEMENT objects with same attribute-value must have been selected before an ELEGY object may occur again, where the number is specified in the value of the value1 attribute.

Filtering on attributes (type z3): The rule stipulates that certain attribute-values are unwanted, wherefore the selection disregards objects with these values, where the unwanted attribute-values are specified in the value1 attribute.

Repetition-length for same position (type z4): The rule stipulates that a certain number of other ELEMENT objects must have been selected before the same ELEMENT object occur again for the same TEMPLATE object, where the number is specified by the value in the value1 attribute.

Table 8b below exemplifies unique rules applicable for the ENGINE object and its processing (the overall, but specific boundaries for Δ-computation), for the actively selected SEQUENCEMODEL (with overall but specific rules for Δ-computation applicable for all its components), and TEMPLATE objects (with specific rules for Δ-computation with an onset in each specific TEMPLATE object).

TABLE 8b

Priority of Rules

| Set of Rules | MinMatch | Distance (distance) | Random Topset |
|---|---|---|---|
| ENGINE | 75 | 7 | 4 |
| SEQUENSMODEL | 80 | 12 | — |
| TEMPLATE1 | 87 | 34 | 7 |
| ▶TEMPLATE2 | 85 | — | 7 |
| TEMPLATE3 | 83 | 34 | 2 |
| TEMPLATE4 | 80 | — | — |
| TEMPLATE5 | 85 | 34 | 7 |

In Table 8b the ENGINE object has completed A-computation for all available elements with an onset in the TEMPLATE object "template1", and is ready to Δ-computation of all available elements with an onset in the TEMPLATE object "template2". The ENGINE object instructs the RULEBOOK to find those rules that apply in this situation. RULEBOOK object acknowledges that in this case "template2" has a requirement on a threshold value (minmatch percent) at 85, which means that the Δ-treatment shall disregard all elements that taken on a value below the threshold (85).

From the example in Table 8b it is apparent that distance is not specified for "template 2", wherefore the RkTBOOK object in the A-calculation falls back on the overall SEQUENCEMODEL object's distance setting (which in this case takes on the value "12").

After completed Δ-calculation on the element-collection with an onset in "template2", the ENGINE object continues with Δ-calculation with an onset in "template3", the procedure of which follows the procedure for "template1" described above.

From the example in Table 8b it is apparent that in the case of Δ-calculation with an onset in "template4", the RULEBOOK object will acknowledge that it is the ENGINE object's overall rule concerning top-set (with the value "4") that applies, since neither TEMPLATE object or the common SEQUENCEMODEL object has any rule to this effect.

Sequences are generated in accordance with the favored realisation of the invention, by using the user-interface described and the methods and algorithms-above. The favored realisation of the invention can be implemented as software or hardware or in some combination hereof in multiple ways.

The invention claimed is:

1. A method of generating sequences of elements from a collection of elements from references to and meta-data of said elements stored on a computer readable medium, said method utilizing a profile comprising information relating to the profile originator, the profile generation and profile applicability, said method mapping sets of element-candidates to sequences, and said method mapping elements to sequences from said sets, comprising the steps of:

utilizing a sequence-template associated with, said sequence-template comprising a set of ideal-elements, arranged in a sequence specified by the profile originator in connection with the profile generation, identifying element-candidates by, for each specifying ideal-element in turn, generating a quality-ranked matchlist of the totality of elements in the collection of elements, generating matchlists by, for each element in the collection of element, calculating a quantifiable distance Δ, representing similarity, between the ideal-element and the first element based on the meta data and applying this step to each element in the collection of elements; and quality ranking the elements into a matchlist by increasing distance Δ to the ideal-element in question; and selecting the optimal candidate from each matchlist and placing it in a result-sequence.

2. Method according to claim 1, characterized by continually extending the sequence generated by re-applying the ideal-elements of the sequence-template in accordance with the prescribed sequence specification as a means to continually generate matchlists from which to select optimal candidates into a result-sequence.

3. Method according to claims 1, characterized by randomly mapping to the result-sequence an element from amongst an element set comprising the most qualified element in the matchlist and one or more of the lesser qualified elements in quality-ranked distance Δ in the matchlist, by utilizing a random number generator.

4. Method according to claim 1, characterized by the calculation of distance Δ being effected by the organization of meta-data into types and a weight value assigned to each respective type of meta-data, thereby effecting the final resulting calculation of distance Δ for each element relative to the ideal-element.

5. Method according to claim 1, characterized by the calculation of distance Δ being effected by the organization of meta-data into groups and a weight value assigned to each respective group of element, thereby effecting the final resulting calculation of distance Δ for each element relative to the ideal-element.

6. Method according to claim 1, characterized by the selection of elements from matchlists to result-sequence taking into account rules applicable to the sequence generation, by in a rulebook identifying the sequence generation rules and applying them sequentially in the selection process.

7. Method according to claim 1, characterized by the selection of elements from matchlists to resultsequence taking into account rules applicable to the sequence-template, by in a rulebook identifying the specific sequence-template rules and applying them sequentially in the selection process.

8. Method according to claim 1, characterized by the selection of elements from matchlists to result-sequence taking into account rules applicable to the each ideal-element, by in a rulebook identifying the specific ideal-element rules and applying them sequentially in the selection process.

9. Method according to claim 1, characterized by the matchlist residual-all the elements of the matchlist not selected for the result-sequence are stored in the computer readable medium for subsequent presentation and processing.

10. A computer readable medium comprising a program code for performing the method defined in claim 1.

11. An apparatus for generating sequences of elements from a collection of elements from meta-data of said elements stored on a computer readable medium comprising
  means for selection profile profile comprising information relating to the profile generator, the profile generation and profile applicability,
  means by initial profile selection for the sequence generation
  means for mapping sets of element-candidates to sequences, and
  means for mapping elements to sequences from said sets, and further comprising:
  means by utilizing a sequence-template attached to the profile, said sequence-template comprising a set of specifying ideal-elements, arranged in a sequence specified by the profile generator in connection with the profile generation,
  means by identifying element-candidates by, for each specifying ideal-element in turn, generating a quality-ranked matchlist of the totality of elements in the collection of elements,
  means by generating matchlists by, for each element in the collection of elements, calculating a quantifiable distance $\Delta$, representing similarity, between the ideal-element and the first element based on the meta data and applying this step to each element in the collection of element; and
  quality rank the elements into matchlist by increasing distance $\Delta$ to the ideal-element in question; and
  selecting the optimal candidate from each matchlist and placing it in result-sequence.

12. Apparatus according to claim 11, characterised by including means to indefinitely extend the sequence generated, by re-applying the sequence-templates specifying ideal-elements observing the existing order sequence specification as the basis for continual production of matchlists and subsequent optimal selection to an endsequence.

13. Apparatus according to claim 11, characterised by including means to enable that the selection apart from the first element qualifies one or more of the by increasing distance $\Delta$ ordered elements in the matchlist, and via the computer's randomgenerator or via another randomgenerator connected to the computer, selecting one random element among the qualified, and insert it into the end-sequence.

14. Apparatus according to claim 11, characterised by including means to enable that the calculation of distance $\Delta$ is influenced by the fact that meta data is organised in groups, and that the respective types of meta-data are weighted mutually and thereby proportionally influence the final calculation of distance $\Delta$ for each collection-element relative to the ideal-element.

15. Apparatus according to claim 11, characterised by including means to enable that the calculation of distance $\Delta$ is influenced by the fact that meta-data is organised in groups, in that the groups are mutually weighted, and thereby proportionally influence the final calculation of distance $\Delta$ for each collection-element relative to the ideal-element.

16. Apparatus according to claim 11, characterised by including means to enable that the selection observes the rules applicable to the overall production of sequences, by consulting a rulebook finding the rules that apply for production of sequences, and applying these during the production of sequences.

17. Apparatus according to claim 11, characterised by including means to enable that the selection observes rules applicable for the current sequence-template, by consulting a rulebook finding the rules that apply for the sequence-template in question and applying these during the selection.

18. Apparatus according to claim 11, characterised by including means to enable that the selection observes rules applicable to different, varying ideal-elements in question, by consulting a rulebook finding the rules that apply specifically for each ideal-elements and applying these during the selection.

19. Apparatus according to claim 11, characterised by including means to make the residualset instantly accessible to presentation and/or subsequent data-processing, by storing each of the qualitatively ranked match-lists in the computer-readable medium, where the residualset contain the leftover match-list elements that did not get selected for the end-sequence.

* * * * *

UNITED STATES PATENT AND TRADEMARK OFFICE
CERTIFICATE OF CORRECTION

PATENT NO. : 7,249,142 B2
APPLICATION NO. : 10/490922
DATED : July 24, 2007
INVENTOR(S) : Jacob Falkentorp Altschul, Peter Berg Steffensen and Mikael Altschul Henderson It is certified that error appears in the above-identified patent and that said Letters Patent is hereby corrected as shown below:

Column 2, Line 33  Delete: "systeme"
Insert --system--

Column 4, Line 6  Delete: "from"

Column 23, Line 27  Delete: "means for selection profile profile comprising"
Insert --means for utilizing a profile comprising--

Column 23, Line 28  Delete: "relating to the profile generator,"
Insert --relating to the profile originator,--

Column 23, Lines 30, 31  Delete: "means by initial profile selection for the sequence generation"
Insert --means for selection profile for sequence generation--

Signed and Sealed this

Thirteenth Day of May, 2008

JON W. DUDAS
*Director of the United States Patent and Trademark Office*